US011557822B2

(12) United States Patent
Sjödin et al.

(10) Patent No.: US 11,557,822 B2
(45) Date of Patent: Jan. 17, 2023

(54) ANTENNA RADOME HEATING FOR POINT TO POINT RADIO LINKS (71) Applicant: Telefonaktiebolaget LM Ericsson (publ), Stockholm (SE)

(72) Inventors: Martin Sjödin, Gothenburg (SE); Lei Bao, Gothenburg (SE); Jonas Hansryd, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 18 days.

(21) Appl. No.: 17/260,287

(22) PCT Filed: Aug. 31, 2018

(86) PCT No.: PCT/EP2018/073480
§ 371 (c)(1),
(2) Date: Jan. 14, 2021

(87) PCT Pub. No.: WO2020/043309
PCT Pub. Date: Mar. 5, 2020

(65) Prior Publication Data
US 2021/0296753 A1 Sep. 23, 2021

(51) Int. Cl.
*H01Q 1/02* (2006.01)
*H01Q 1/42* (2006.01)
(Continued)

(52) U.S. Cl.
CPC ............ *H01Q 1/02* (2013.01); *H01Q 1/42* (2013.01); *H04B 1/40* (2013.01); *H04W 52/0206* (2013.01)

(58) Field of Classification Search
CPC ............ H01Q 1/42; H01Q 1/02; H01Q 1/422; H01Q 1/425; H01Q 1/28; H01Q 21/064;
(Continued)

(56) References Cited

U.S. PATENT DOCUMENTS

| 4,761,828 A | 8/1988 | Rinderle |
| 5,861,855 A * | 1/1999 | Arsenault ............... H01Q 1/02 343/703 |

(Continued)

FOREIGN PATENT DOCUMENTS

| CN | 101951680 A | 1/2011 |
| CN | 105379370 A | 3/2016 |

(Continued)

OTHER PUBLICATIONS

Olausson, T. et al., "Disturbance Detection and Classification in Large Microwave Networks", Chalmers University of Technology Master Thesis, Jan. 1, 2017, pp. 1-48, Chalmers University of Technology.

(Continued)

*Primary Examiner* — Ajibola A Akinyemi
(74) *Attorney, Agent, or Firm* — Coats & Bennett, PLLC (57) ABSTRACT The present disclosure relates to an adaptive antenna radome heating system (200, 300, 400) for a point to point radio link, where the adaptive antenna radome heating system comprises a processing unit (150, 220, 420) and at least one point to point radio link transceiver (TRX) (111, 121; 210A, 210B, 210C). Each TRX comprises an antenna radome (110, 120) having an antenna radome heating device (140, 141) configured to be activated by a control signal (R1, R2, RN). The processing unit (150, 220, 420) is arranged to determine an onset of accumulated precipitation on the antenna radome of the at least one TRX (111, 121; 210A, 210B, 210C) and to activate the corresponding antenna radome heating device (140, 141) by the control signal (R1, R2, RN) in response to determining the onset of accumulated precipitation.

20 Claims, 5 Drawing Sheets (51) Int. Cl.
*H04B 1/40* (2015.01)
*H04W 52/02* (2009.01)

(58) Field of Classification Search
CPC ........ H01Q 19/062; H01Q 1/002; H01Q 1/40;
H01Q 21/065; H01Q 13/0258; H01Q
15/0013; H01Q 15/08; H01Q 17/001;
H01Q 1/185; H01Q 15/16; H01Q 1/246;
H01Q 1/288; H01Q 1/405; H01Q 1/48
USPC ...................................................... 455/562.1
See application file for complete search history.

(56) References Cited

U.S. PATENT DOCUMENTS

| | | | |
|---|---|---|---|
| 8,984,939 | B1 | 3/2015 | Eilts et al. |
| 9,119,178 | B2 | 8/2015 | Dimou et al. |
| 9,596,615 | B1 | 3/2017 | Sun et al. |
| 10,374,298 | B2 * | 8/2019 | Be ................. H01Q 1/3275 |
| 2007/0120759 | A1 * | 5/2007 | Hawes ................ H01Q 1/425 |
| | | | 343/872 |
| 2009/0160700 | A1 | 6/2009 | Messer-Yaron et al. |
| 2010/0150067 | A1 | 6/2010 | Penisoara et al. |
| 2014/0139395 | A1 * | 5/2014 | Solondz ............... H01Q 1/246 |
| | | | 343/872 |
| 2015/0145717 | A1 | 5/2015 | Lim |
| 2016/0173227 | A1 | 6/2016 | Kikuma |
| 2017/0280389 | A1 | 9/2017 | Guilhaumon et al. |
| 2018/0287830 | A1 | 10/2018 | Merlin et al. |
| 2019/0150737 | A1 | 5/2019 | Bodurka et al. |
| 2019/0182881 | A1 | 6/2019 | Teyeb et al. |
| 2019/0260496 | A1 | 8/2019 | Emmanuel et al. |
| 2019/0360739 | A1 * | 11/2019 | Brown ................... E01D 19/16 |

FOREIGN PATENT DOCUMENTS

| | | |
|---|---|---|
| DE | 3447282 A1 | 7/1986 |
| WO | 2018036608 A1 | 3/2018 |
| WO | 2018075180 A1 | 4/2018 |
| WO | WO-2018075180 A1 * | 4/2018 ............ H01Q 19/08 |

OTHER PUBLICATIONS

Overeem, A., et al., "Measuring Urban Rainfall Using Microwave Links From Commercial Cellular Communication Networks", Water Resources Research, Dec. 6, 2011, pp. 1-16, vol. 47, W12505, American Geophysical Union.

Kim, M., et al., "Rainfall Detection and Rainfall Rate Estimation Using Microwave Attenuation", Atmosphere, Jul. 24, 2018, pp. 1-21, vol. 9, MDPI.

Lopez-Roldan, J., et al., "Development of a Pocket Ultrahigh Frequency Partial-Discharge Detector to Warn Switchyard Personnel of Imminent Failure of a Nearby High-Voltage Plant", IEEE Electrical Insulation Magazine, Jan.- Feb. 2012, pp. 6-11, vol. 28, No. 1, IEEE.

* cited by examiner

ANTENNA RADOME HEATING FOR POINT TO POINT RADIO LINKS

TECHNICAL FIELD

The present disclosure relates to point to point radio communication links, such as microwave radio links. There is disclosed herein heated antenna radome arrangements and methods for heating an antenna radome.

BACKGROUND

Microwave links are used all over the world for wireless backhaul of data traffic between base stations and a core network. They are popular since they are easy to install, cost efficient, support high capacities, and can achieve high availability over long distances.

The most common impairments limiting the availability are rain fading and selective fading due to multipath propagation. Another impairment, which may occur when ambient temperature is relatively low, is power loss induced by so-called "wet snow", that implies more "stickiness" compared to dry snow, at least partly covering the antenna. This may result in deep fades that are independent of hop length or frequency, as opposed to rain fading which tends to be more severe when the hop length and/or the carrier frequency increase.

An antenna radome can be equipped with heaters to increase the temperature of the antenna radome surface to prevent accumulation of dew or snow. By keeping the antenna radome at a high temperature in cold weather, impairments from dew or snow can be mitigated.

The problem with the existing approach is that a lot of energy is wasted if the antenna radome is constantly kept at a high temperature in cold weather. During the winter, the temperature can be below zero for several months in a row in some areas of the world.

It is therefore desired to have antenna radome heating which is less energy consuming.

SUMMARY

The object of the present disclosure is to provide antenna radome heating which is less energy consuming.

This object is obtained by means of an adaptive antenna radome heating system for a point to point radio link, where the adaptive antenna radome heating system comprises a processing unit and at least one point to point radio link transceiver, (TRX). Each TRX comprises an antenna radome having an antenna radome heating device configured to be activated by a control signal. The processing unit is arranged to determine an onset of accumulated precipitation on the antenna radome of the at least one TRX, and to activate the corresponding antenna radome heating device by the control signal in response to determining the onset of accumulated precipitation This enables energy saving since antenna radomes only are heated when environmental conditions call for it.

According to some aspects, the processing unit is arranged to obtain link data from the at least one TRX, wherein the link data comprises received signal power data associated with an operation of the at least one TRX. The processing unit is arranged to determine the onset of accumulated precipitation on the antenna radome of the at least one based on the link data.

According to some aspects, the processing unit is arranged to monitor a precipitation level in a geographical region in which the at least one TRX is deployed by comparing the received signal power data with a respective reference signal power level of the at least one TRX, and to determine the onset of accumulated precipitation on the antenna radome of the at least one TRX based on the precipitation level.

This means that it can be determined to only heat one antenna radome in a point to point radio link, saving energy.

According to some aspects, the link data further comprises any of; an adaptive filter state, a mean-squared error (MSE) value associated with data detection, and a power difference determined before and after channel filter, associated with the at least one TRX.

This enables many different options for the link data.

According to some aspects, the processing unit is arranged to obtain weather data associated with a geographical region in which the at least one TRX is deployed, wherein the processing unit is arranged to determine the onset of accumulated precipitation on the antenna radome of at least one TRX based on the weather data.

This means that it can be determined to only heat one antenna radome in a point to point radio link, saving energy. This also means that false antenna radome heating device activation is counteracted, for example if it a warm sunny day.

According to some aspects, the weather data comprises a current temperature value indicating an ambient temperature in a vicinity of the at least one TRX.

This means that false antenna radome heating device activation is counteracted, for example if it a warm sunny day.

According to some aspects, the weather data comprises weather prediction information indicating a future weather condition in a geographical vicinity of the at least one TRX.

This provides further data for evaluating if one or more antenna radome heating devices should be activated or not.

According to some aspects, the at least one TRX comprises a point to point microwave radio link transceiver.

According to some aspects, the processing unit arranged to determine an onset of accumulated precipitation on the antenna radome of the at least one TRX is comprised in a central processing node.

In this manner, coordinated control of radome heating can be obtained.

According to some aspects, the adaptive antenna radome heating system comprises one TRX only, wherein the processing unit that is arranged to determine an onset of accumulated precipitation on the antenna radome of said TRX is comprised in said TRX.

This enables an uncomplicated implementation of the present disclosure, enabling one TRX at a time to be equipped with the adaptive antenna radome heating system.

According to some aspects, the processing unit is arranged to determine the onset of accumulated precipitation on the antenna radome of the at least one TRX based on the link data using a machine learning algorithm.

A machine-learning algorithm can be used to sort new data into the different classes with high accuracy. A machine-learning algorithm can be used to determine the cause of changed received power of radio links, determining when additional link attenuation is caused by an onset of accumulated precipitation, and when it is caused by other impairments.

According to some aspects, the processing unit is arranged to determine the onset of accumulated precipitation on the antenna radome of the at least one TRX based on the link data using a classification device.

This object is also obtained by means of a processing unit, methods, a computer program product and a point to point radio link which all are associated with corresponding advantages.

More specifically, this object is also obtained by means of a processing unit arranged to determine an onset of accumulated precipitation on an antenna radome of at least one TRX and to activate the corresponding antenna radome heating device by a control signal in response to determining the onset of accumulated precipitation.

Moreover, this object is also obtained by means of a method for adaptive antenna radome heating in point to point radio links, where the method comprises determining an onset of accumulated precipitation on the antenna radome of at least one TRX. The method further comprises activating the corresponding antenna radome heating device by a control signal in response to determining the onset of accumulated precipitation.

Moreover, this object is also obtained by means of a computer program product comprising a computer program according to the above method, and a computer readable storage medium on which the computer program is stored.

Moreover, this object is also obtained by means of a point to point radio link comprising an adaptive antenna radome heating system according to the above.

BRIEF DESCRIPTION OF THE DRAWINGS

The present disclosure will now be described more in detail with reference to the appended drawings, where.

DETAILED DESCRIPTION

Aspects of the present disclosure will now be described more fully with reference to the accompanying drawings. The different devices, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
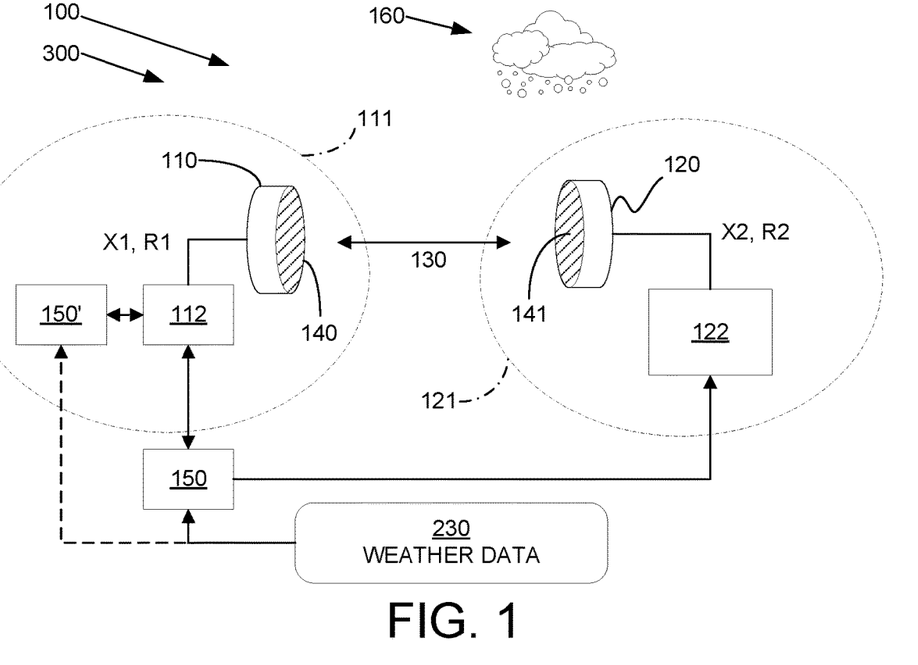
FIG. 1 shows a schematic view of a point to point radio communication link with an adaptive antenna radome heating system.

With reference to FIG. 1, there is a point to point radio link 100 which comprises a first point to point radio link transceiver (TRX) 111 and a second TRX 121 which are adapted communicate via a channel 130. Each TRX 111, 121 comprises a corresponding first antenna radome 110, having a first antenna radome heating device 140, and second antenna radome 120, having a second antenna radome heating device 141. Each TRX 111, 121 also comprises a corresponding first radio unit (RAU) 112 and second RAU 122.

Each antenna radome heating device 140, 141 is adapted to produce heat such that accumulation of dew and wet snow on the antenna radome due to precipitation 160 is prevented. It is, however, desired to not have the heating devices 140, 141 turned on all the time.

According to the present disclosure, there is an adaptive antenna radome heating system 300 that comprises a processing unit 150 and the TRX:s 111, 121, where each antenna radome heating device 140, 141 is configured to be activated and de-activated by a corresponding control signal R1, R2 where the processing unit 150 is adapted to transmit the control signals to each radome heating device 140, 141. The processing unit 150 is arranged to determine an onset of accumulated precipitation, e.g. snow, ice or dew accumulation, on the antenna radomes 110, 120 and to activate the antenna radome heating devices 140, 141 by the control signals R1, R2 in response to determining the onset of snow, ice or dew accumulation.

According to some aspects, the processing unit 150 is arranged to obtain link data X1, X2 from the TRX:s 111, 121, wherein the link data X1, X2 comprises received signal power data associated with an operation of the TRX:s 111, 121. The processing unit 150 is arranged to determine the onset of snow, ice or dew accumulation on the antenna radomes 110, 120 based on the link data X1, X2.

According to some aspects, received signal power data that is associated with an operation of the point to point radio link 100 relates to at least one of information acquired during ordinary data traffic, information acquired via a designated control channel in the communication band, information acquired via a periodically transmitted pilot sequence, information acquired via a signal that is transmitted on demand and information acquired via a specific measurement signal that is transmitted in a band that is separated from the communication band. The above are only examples, the received signal power data can be associated with an operation of the point to point radio link 100 in many other ways.

According to some aspects, the processing unit 150 is arranged to monitor a precipitation level in the geographical region in which the TRX:s 111, 121 are deployed by comparing the received signal power data with a respective reference signal power level of the TRX:s 111, 121, and to determine the onset of snow, ice or dew accumulation on the antenna radome of the TRX:s 111, 121 based on the precipitation level.

Such a reference power level can for example be a power level that corresponds to absence of precipitation or correspond to transmitted signal power such that link attenuation can be established.

The power level may be measured in Watts, dBm, or the like. The power level may be measured in absolute terms or relative to some reference power level, in which case the power level can be measured in dB. It is appreciated that a power level may be measured in a frequency band using known techniques which will not be discussed in detail herein. It is appreciated that power level can also be measured or indicated implicitly, for instance via a mean-squared error value.

Thus, received signal power should be interpreted broadly to encompass any measurement or indication from which received signal power can be at least partly inferred. According to some aspects, received signal power data relates to measured received power relative a certain reference power level. According to some further aspects, received signal power data comprises information regarding link attenuation and also indirect measures such as bit errors, package errors etc.

Figure 2:
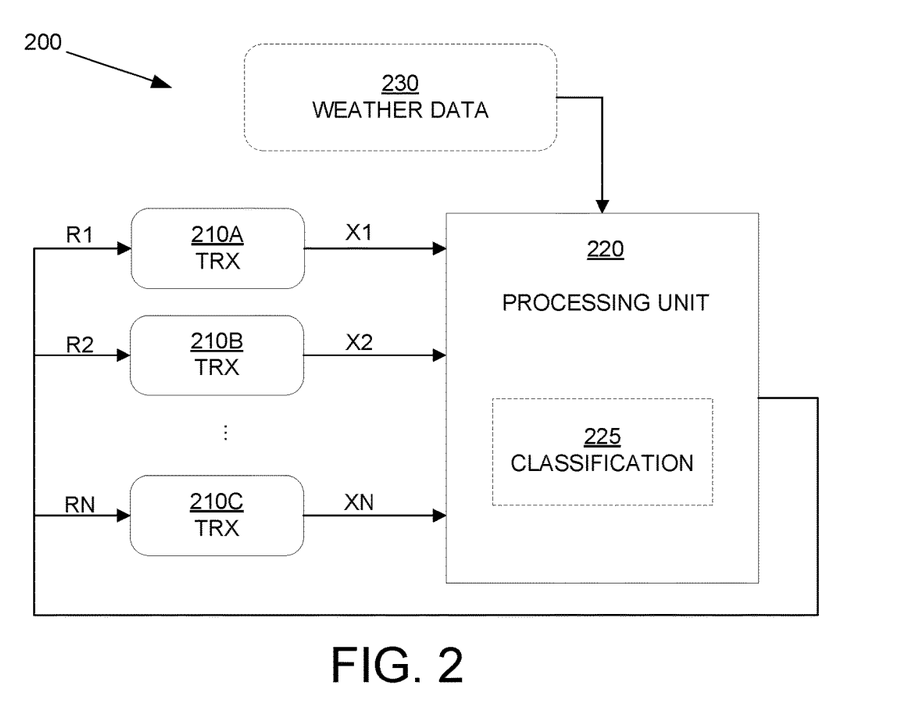
FIGS. 2-3 illustrate example adaptive antenna radome heating systems.

A more general adaptive antenna radome heating system 200 is shown in FIG. 2 where there are N TRX:s 210A, 210B, 210C which are comprised in a point to point radio link network 430. A processing unit 220 is adapted to receive link data X1, X2, XN from these TRX:s 210A, 210B, 210C and to issue corresponding control signals R1, R2, RN to the TRX:s 210A, 210B, 210C. There can be any number N of TRX:s comprised in the adaptive antenna radome heating system 300, but there is, however, at least one. In the case of only one TRX 111 being comprised in the adaptive antenna radome heating system 300, the processing unit 150' is comprised in that TRX 111 as indicated with dashed lines in FIG. 1.

According to some aspects, also in the case of two or more TRX:s being comprised in the adaptive antenna radome heating system 300, at least one processing unit 150' can be comprised in a corresponding TRX 111. In this case, there can also be a processing unit 150 that is separate from the TRX:s.

According to some aspects, the link data X1, X2, XN further comprises any of; an adaptive filter state, a mean-squared error (MSE) value associated with data detection, and a power difference determined before and after channel filter, associated with the at least one TRX 111, 112; 210A, 210B, 210C.

According to some aspects, the processing unit 150 is arranged to obtain weather data 230 associated with a geographical region in which at least one TRX 111, 112; 210A, 210B, 210C is deployed, wherein the processing unit 150, 220 is arranged to determine the onset of snow, ice or dew accumulation on the antenna radome of the TRX:s 111, 112; 210A, 210B, 210C based on the weather data 230.

For example, the weather data comprises a current temperature value indicating an ambient temperature in a vicinity of the at least one TRX 111, 112; 210A, 210B, 210C. According to some aspects, the weather data 230 comprises weather prediction information indicating a future weather condition in a geographical vicinity of the at least one TRX 111, 112; 210A, 210B, 210C.

According to some aspects, the processing unit 150 is arranged to obtain weather data 230 associated with a geographical region in which at least one TRX 111, 112; 210A, 210B, 210C is deployed and to use said weather data 230 for the TRX:s deployed in the geographical region and according to some other aspects also for TRX:s deployed outside the geographical region.

By means of the weather data 230, it can be determined whether only one antenna radome heating device 140, 141 needs to be activated for a point to point radio link 100, for example if it can be determined that it is snowing only at one TRX 111, only the corresponding antenna radome heating device 140 needs to be activated.

According to some aspects, the processing unit 150 is arranged to monitor a precipitation level in a geographical region in which at least one TRX 111, 121 is deployed by comparing the received signal power data with a respective reference signal power level of said TRX 111, 121, and to determine the onset of accumulated precipitation on the antenna radome of said TRX 111, 121 based on the precipitation level. The precipitation level can for example be monitored as weather data as discussed above, and according to some aspects by monitoring received signal power for several point to point radio links in a point to point radio link network.

Figure 3:
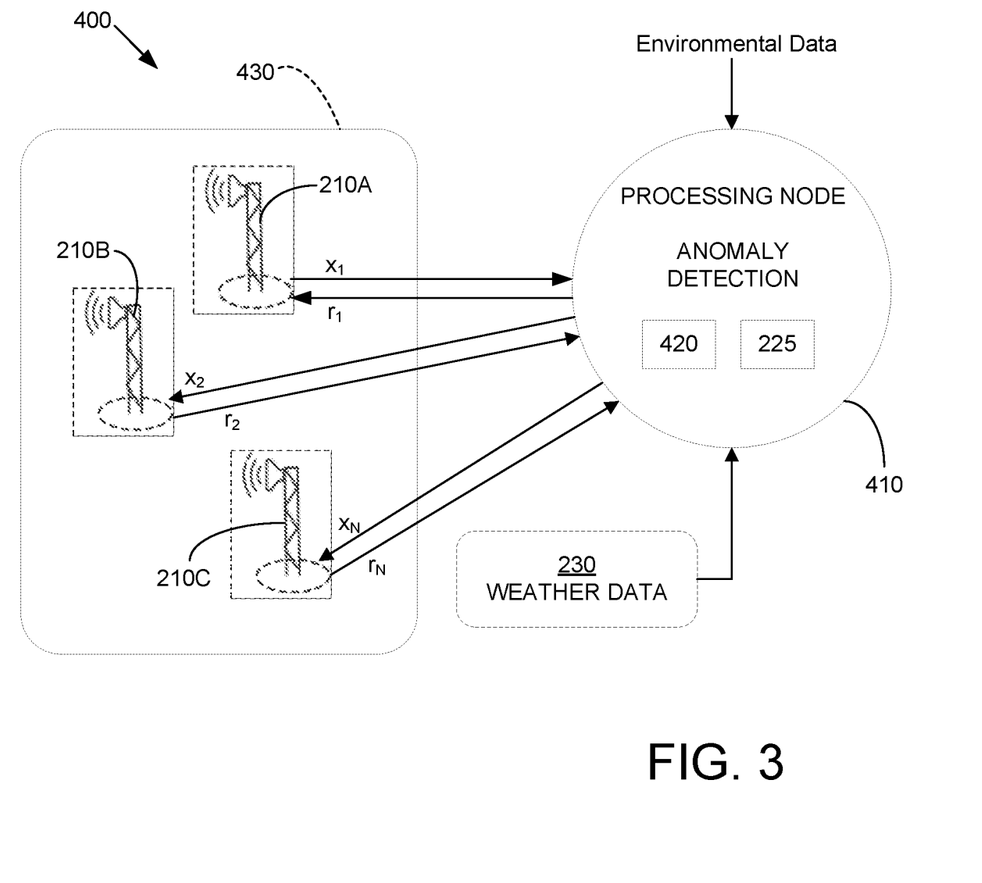

According to some aspects, with reference to FIG. 2 and FIG. 3, the processing unit 220, 420 that is arranged to determine an onset, i.e. a presence, of snow, ice or dew accumulation on the antenna radome of at least one TRX 210A, 210B, 210C is comprised in a central processing node 410.

According to some aspects, as shown in FIG. 2 and FIG. 3, the processing unit 150, 220, 420 is arranged to determine the onset of snow, ice or dew accumulation on the antenna radome of at least one TRX 111, 112; 210A, 210B, 210C based on the link data using a classification device 225.

The link data X1, X2, XN may be constituted by time series vectors from the TRX:s 111, 112; 210A, 210B, 210C in a given time window and possibly together with metadata to form a feature vector which is processed by the classification device 225 to determine the channel conditions/impairments that affect the link. The processing node 410 is adapted to decide for which TRX:s 111, 112; 210A, 210B, 210C in the point to point radio link 100 to turn on the antenna radome heating by activating the corresponding antenna radome heating devices 140, 141. For this reason, the processing node 410 is adapted to send control signal R1, R2, RN back to the TRX:s 111, 112; 210A, 210B, 210C with control information for the antenna radome heating devices 140, 141. The processing node 410 can also use the data extracted from the point to point radio link 100 to predict beforehand which TRX:s 111, 112; 210A, 2108, 210C that are likely to be affected by precipitation in the near future, and take preemptive measures.

The classification device 225 provides as its outputs measures for certain phenomena it has learned to recognize, and these measures can be used to determine whether precipitation 160 is present or not.

The link data X1, X2, XN can be, e.g., sampled values of the received power or link attenuation during the time window, and may also include performance indicators such as mean-square-error, error vector magnitude, equalizer tap values, and measures of interference from other radio links, which can be extracted from the modem used for baseband processing.

According to some aspects, the classification device 225 comprises a machine learning model that has been trained beforehand using known data which represent the classes of channel conditions/impairments the classifier should learn to recognize. After the training has been completed, the classification device 225 can partition the feature vector space into one region per channel condition/impairment, possibly there can be an overlap between the regions belonging to different classes. There is one output node per class, representing the probability that a feature vector belongs to that class. When a new feature vector is classified one assumes it belongs to the class whose output node has the largest value, i.e., highest probability.

The classification device 225 is thus used to identify precipitation 160 where different channel conditions typically result in distinctly different patterns for the link data X1, X2, XN. It is possible to teach a machine-learning model to perform a mapping from an input vector space, the space of the time series vectors in the form of the link data X1, X2, XN, to output probabilities for a set of pre-defined classes of channel conditions/disturbances, which include precipitation, normal operation, multipath propagation, and signal obstruction from objects such as for example cranes at construction sites. The machine-learning model can be regarded as a filter where known data is presented to an iterative training algorithm which adapts the tap weights until convergence is achieved. According to some aspects, the machine-learning model is used to sort new data into the different classes with high accuracy, provided that the dataset used for training has provided a representative view of each class.

Machine learning models and/or signal processing are thus according to some aspects used to determine the cause of reduced received power of radio links, determining when additional link attenuation is caused by precipitation, and when it is caused by other impairments.

According to some aspects, the processing unit 150, 220, 420 is thus arranged to determine the onset of snow, ice or dew accumulation on the antenna radome of at least one TRX 111, 112; 210A, 210B, 210C based on the link data using a machine learning algorithm.

Antenna radome heating by means of the antenna radome heating devices 140, 141 will in accordance with the present disclosure be used only when it is anticipated that problems with snow or dew may occur. To make such predictions, the data from the TRX:s 111, 121; 210A, 210B, 210C in a point to point radio link 100 is used to detect if, e.g., snowy weather is present or approaching.

Machine learning classifiers can according to some aspects be applied to time series vectors of received power data from the TRX:s 111, 121; 210A, 210B, 210C to identify precipitation events. Besides link data, meteorological data such as temperature and wind data can also be used by the processing node 410 to improve the accuracy of its predictions.

In this context, a precipitation event is an event that is associated with any product of condensation of atmospheric water vapor that falls under gravity, such as for example rain and snow.

There might be cases where preemptive measures fail and an antenna radome gets covered by, e.g., snow as a consequence. The received power during 24 hours for two TRX:s suffering from this is shown FIG. 4. Such events can also be detected with, e.g., machine learning classifiers, and countermeasures taken by heating up the antenna radome.

Figure 4:
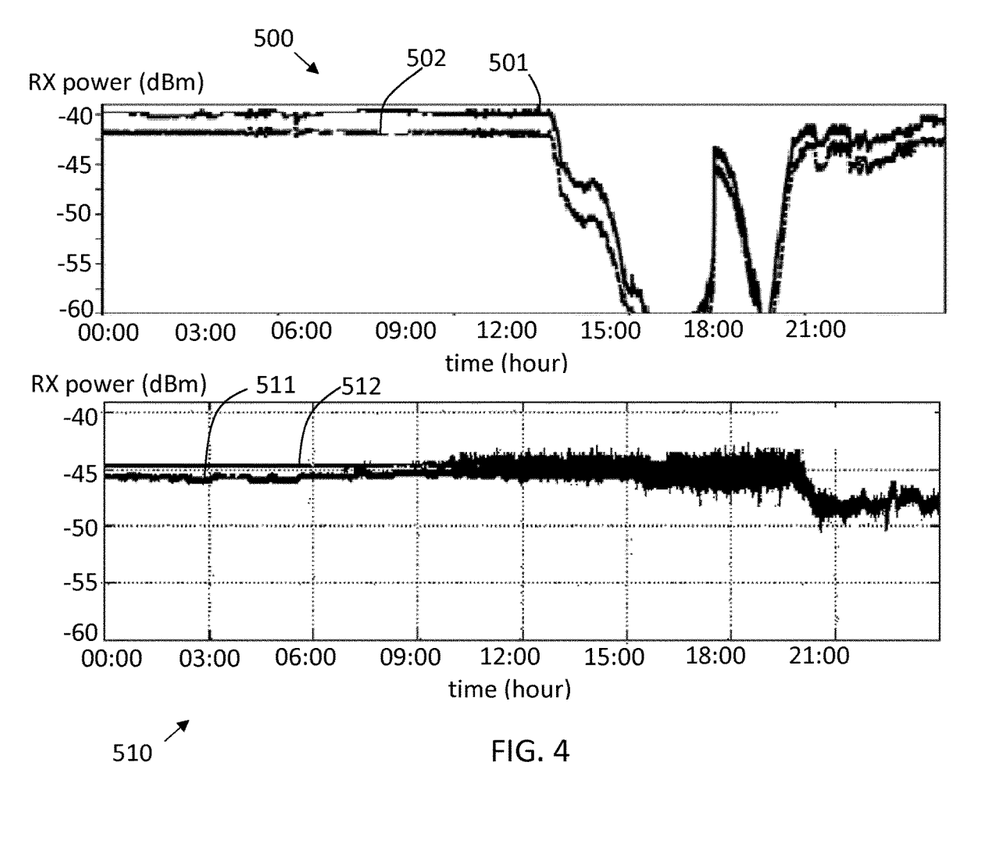
FIG. 4 shows graphs illustrating received signal power over time.

In a first graphic representation 500 of received power over time illustrated with two graphs 501, 502, the antenna radome on one TRX of the point to point radio links accumulates wet snow which causes the received power to drop significantly starting from approximately the time 13:30. About 18:30 it appears that some snow falls from the antenna radome, which yields a large increase in the received power, but as snow continues to accumulate, the power drops again. At 21:00, the power is however almost back to the level it had before the snow accumulation. The impact wet snow can have on the received power as exemplified in the first graphic representation 500 can easily be recognized by the machine learning classifier, and the radome heating devices 140 and 141 can be turned on as a countermeasure.

According to some aspects, the radome heating devices 140, 141 are both turned on if it is not clear onto which antenna radome that the snow has been accumulated, or if snow has been accumulated on both antenna radomes. This is discussed above in association with obtained weather data 230.

In a second graphic representation 510 of received power over time, another case of wet snow accumulation is illustrated with two graphs 511, 512, in which the point to point radio link also is affected by wind. The wind causes the more rapid fluctuations of the received power which are present from about 10:00. Wind generally increases the probability of snow accumulation, and if a machine learning classifier detects windy conditions, the radome heating elements could hence be turned on as a preemptive measure if, e.g., weather data indicates that snow is to be expected.

By means of the present disclosure, information and predictions about weather conditions are used in order to decide when to increase the temperature of antenna radomes. In addition, anomaly detections, possibly together with meteorological data, can be used to find if any antennas radomes in a point to point radio link network 430 are covered by wet snow. If this is found to be the case, the antenna radomes temperature is increased as a countermeasure. In this manner, energy is saved since antenna radomes are only heated when environmental conditions call for it. In contrast to using heaters all the time in low temperatures, it is sufficient to use heaters if precipitation events are detected or expected in the present geographical region.

Each antenna radome 110, 120 are intended to cover an antenna device in a conventional manner and the antenna devices are not further discussed here.

Figure 5:
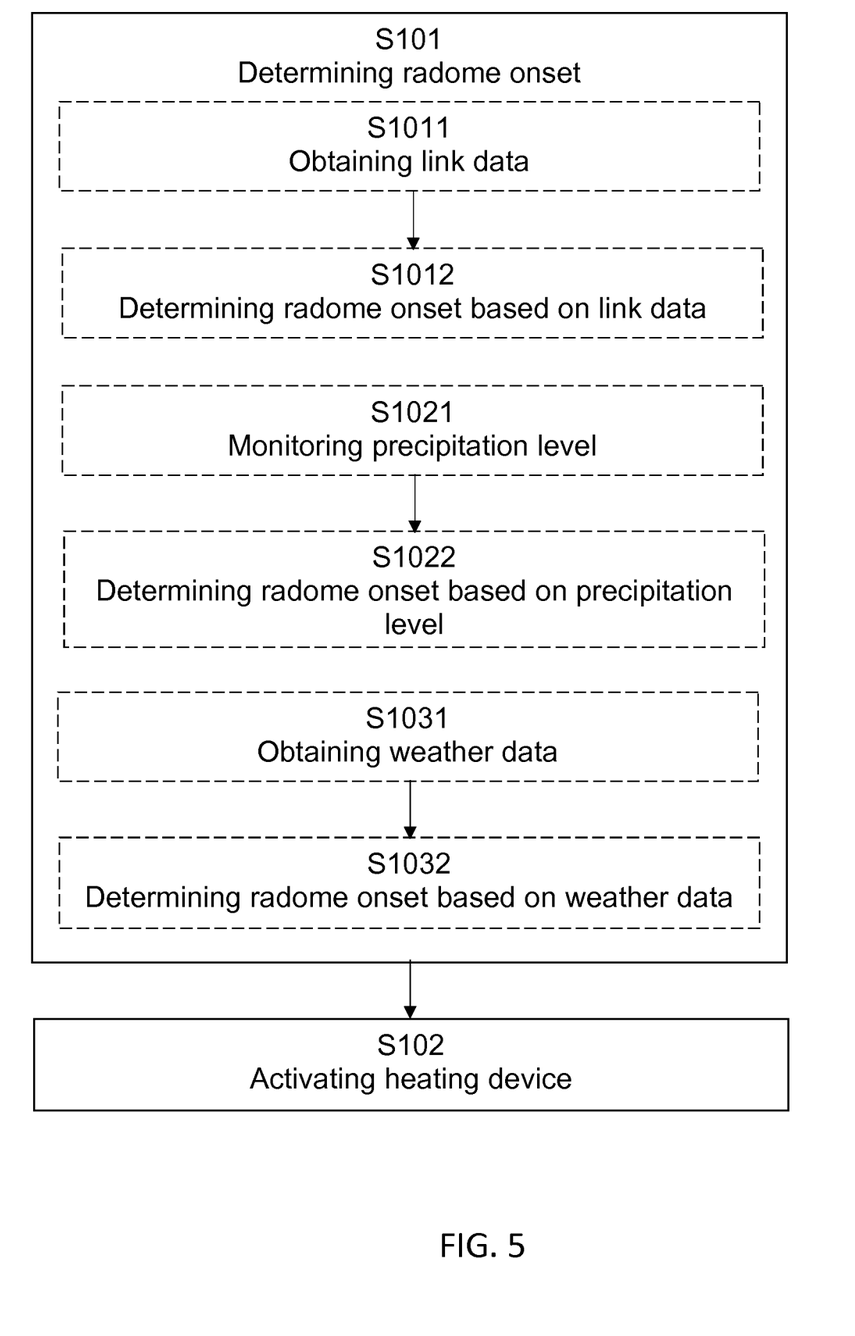
FIG. 5 is a flowchart illustrating methods.

With reference to FIG. 5, the present disclosure relates to a method for adaptive antenna radome heating in point to point radio links 100, where the method comprises determining S101 an onset of accumulated precipitation on the antenna radome of at least one TRX 111, 121; 210A, 210B, 210C; and activating S102 the corresponding antenna radome heating device 140, 141 by a control signal R1, R2, RN in response to determining the onset of accumulated precipitation.

According to some aspects, the method comprises:

obtaining S1011 link data X1, X2, XN from the at least one TRX 111, 121; 210A, 210B, 210C, wherein the link data X1, X2, XN comprises received signal power data associated with an operation of the at least one TRX 111, 121, 210A, 210B, 210C; and determining S1012 the onset of accumulated precipitation on the antenna radome of at least one TRX 111, 121; 210A, 210B, 210C based on the link data X1, X2, XN.

According to some aspects, the method comprises:

monitoring S1021 a precipitation level in a geographical region in which at least one TRX 111, 121; 210A, 2108, 210C is deployed by comparing the received received signal power data with a respective reference signal power level of at least one TRX 111, 121; 210A, 210B, 210C; and determining S1022 the onset of accumulated precipitation on the antenna radome of the at least one TRX 111, 121; 210A, 210B, 210C based on the precipitation level.

According to some aspects, the link data X1, X2, XN further comprises any of; an adaptive filter state, a mean-squared error (MSE) value associated with data detection, and a power difference determined before and after channel filter, associated with the at least one TRX 111, 121; 210A, 210B, 210C.

According to some aspects, the method comprises:

obtaining S1031 weather data 230 associated with a geographical region in which at least one TRX 111, 121; 210A, 210B, 210C is deployed; and determining S1032 the onset of accumulated precipitation on the antenna radome 110, 120 of at least one TRX 111, 121; 210A, 210B, 210C based on the weather data 230.

According to some aspects, the weather data 230 comprises a current temperature value indicating an ambient temperature in a vicinity of at least one TRX 111, 121; 210A, 210B, 210C.

According to some aspects, the weather data 230 comprises weather prediction information indicating a future weather condition in a geographical vicinity of at least one TRX 111, 121; 210A, 210B, 210C.

According to some aspects, the method comprises determining the onset of accumulated precipitation on the antenna radome of at least one TRX 111, 121; 210A, 210B, 210C based on the link data using a machine learning algorithm.

According to some aspects, the method comprises determining the onset of accumulated precipitation on the antenna radome of at least one TRX 111, 121; 210A, 210B, 210C based on the link data using a classification device 225.

According to some aspects, the method is performed by a processing unit 150, 220, 420 according to the above.

Figure 6:
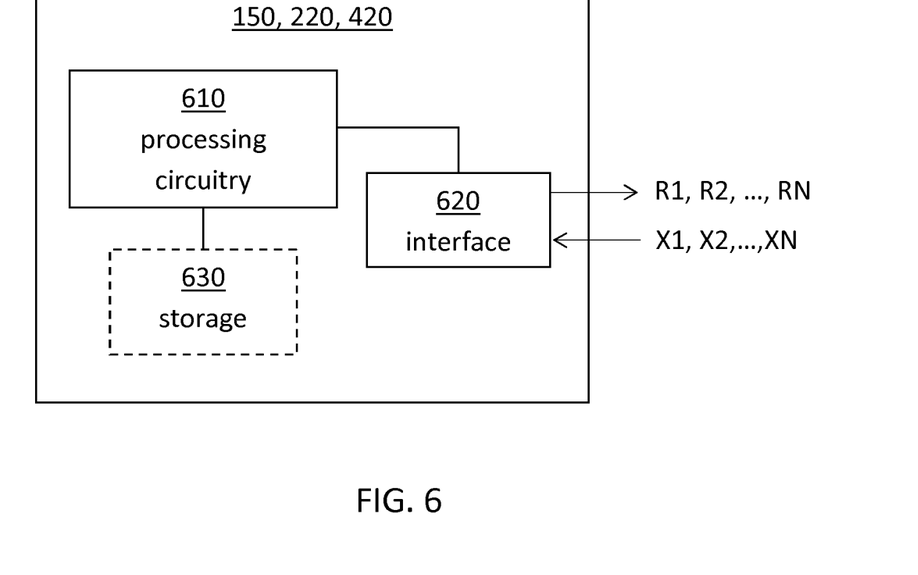
FIG. 6 schematically illustrates processing unit.

FIG. 6 schematically illustrates a processing unit 150, 220, 420 according to aspects of the present disclosure. It is appreciated that the above described methods and techniques may be realized in hardware. This hardware is then arranged to perform the methods, whereby the same advantages and effects are obtained as have been discussed above.

Processing circuitry 610 is provided using any combination of one or more of a suitable central processing unit (CPU), multiprocessor, microcontroller, digital signal processor (DSP), etc., capable of executing software instructions stored in a computer program product, e.g. in the form of a storage medium 630. The processing circuitry 610 may further be provided as at least one application specific integrated circuit (ASIC), or field programmable gate array (FPGA).

Particularly, the processing circuitry 610 is configured to cause the classification unit to perform a set of operations, or steps. For example, the storage medium 630 may store the set of operations, and the processing circuitry 610 may be configured to retrieve the set of operations from the storage medium 630 to cause the classification unit to perform the set of operations. The set of operations may be provided as a set of executable instructions. Thus, the processing circuitry 610 is thereby arranged to execute methods as herein disclosed.

The storage medium 630 may also comprise persistent storage, which, for example, can be any single one or combination of magnetic memory, optical memory, solid state memory or even remotely mounted memory.

The processing unit 150, 220, 420 may further comprise a communications interface 620 for communications with at least one external device. As such the communication interface 620 may comprise one or more transmitters and receivers, comprising analogue and digital components and a suitable number ports for wireline or wireless communication.

The processing circuitry 610 controls the general operation of the unit, e.g. by sending data and control signals to the communication interface 620 and the storage medium 630, by receiving data and reports from the communication interface 620, and by retrieving data and instructions from the storage medium 630. Other components, as well as the related functionality, of the unit are omitted in order not to obscure the concepts presented herein.

Figure 7:
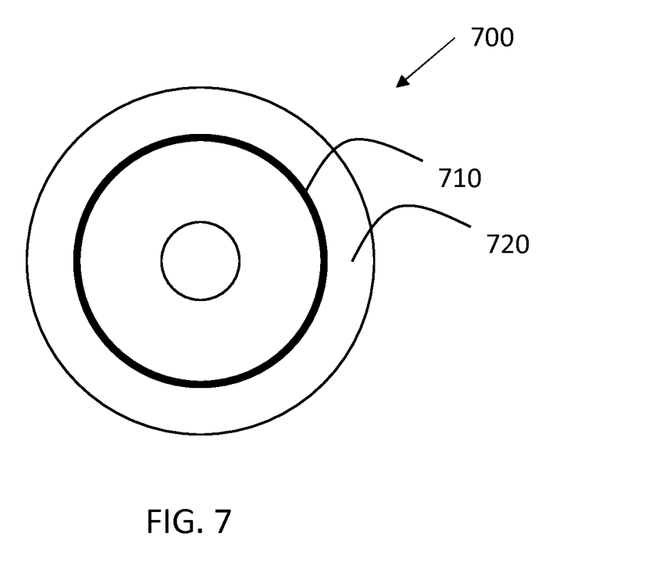
FIG. 7 schematically illustrates a computer program product.

FIG. 7 schematically illustrates a computer program product 700 comprising a computer program 710 according to the disclosure above, and a computer readable storage medium 720 on which the computer program is stored.

According to some aspects, at least one TRX 111, 121; 210A, 210B, 210C comprises a point to point microwave radio link transceiver.

The present disclosure is not limited to the examples described above, but may vary freely within the scope of the appended claims. For example, a point to point radio link may be comprised in a point to point radio link network 430 that in turn can comprise more than one point to point radio link, and thus more than two point to point radio link transceivers 210A, 210B, 210C.

Generally, snow, ice or dew accumulation constitutes accumulated precipitation.

The term onset can also be interpreted broadly as a presence, meaning that the processing unit 150, 220, 420 is arranged to de-activate the corresponding antenna radome heating device 140, 141 by the control signal R1, R2, RN in response to determining the onset or presence of accumulated precipitation.

Generally, the present disclosure relates to an adaptive antenna radome heating system 200, 300, 400 for a point to point radio link, the adaptive antenna radome heating system comprises a processing unit 150, 220, 420 and at least one point to point radio link transceiver (TRX) 111, 121; 210A, 210B, 210C, each TRX comprising an antenna radome 110, 120 having an antenna radome heating device 140, 141 configured to be activated by a control signal R1, R2, RN, the processing unit 150, 220, 420 being arranged to determine an onset of accumulated precipitation on the antenna radome of the at least one TRX 111, 121; 210A, 210B, 210C and to activate the corresponding antenna radome heating device 140, 141 by the control signal R1, R2, RN in response to determining the onset of accumulated precipitation According to some aspects, the processing unit 150, 220, 420 is arranged to obtain link data X1, X2, XN from the at least one TRX 111, 121; 210A, 210B, 210C, wherein the link data X1, X2, XN comprises received signal power data associated with an operation of the at least one TRX 111, 121, 210A, 210B, 210C, wherein the processing unit 150, 220, 420 is arranged to determine the onset of accumulated precipitation on the antenna radome of the at least one TRX 111, 121; 210A, 210B, 210C based on the link data X1, X2, XN.

According to some aspects, the processing unit 150, 220, 420 is arranged to monitor a precipitation level in a geographical region in which the at least one TRX 111, 121; 210A, 210B, 210C is deployed by comparing the received signal power data with a respective reference signal power level of the at least one TRX 111, 121; 210A, 210B, 210C, and to determine the onset of accumulated precipitation on the antenna radome of the at least one TRX 111, 121; 210A, 210B, 210C based on the precipitation level.

According to some aspects, the link data X1, X2, XN further comprises any of; an adaptive filter state, a mean-squared error (MSE) value associated with data detection, and a power difference determined before and after channel filter, associated with the at least one TRX 111, 121; 210A, 210B, 210C.

According to some aspects, the processing unit 150, 220, 420 is arranged to obtain weather data 230 associated with a geographical region in which the at least one TRX 111, 121; 210A, 210B, 210C is deployed, wherein the processing unit 150, 220, 420 is arranged to determine the onset of accumulated precipitation on the antenna radome of at least one TRX 111, 121; 210A, 210B, 210C based on the weather data 230.

According to some aspects, the weather data 230 comprises a current temperature value indicating an ambient temperature in a vicinity of the at least one TRX 111, 121; 210A, 210B, 210C.

According to some aspects, the weather data 230 comprises weather prediction information indicating a future weather condition in a geographical vicinity of the at least one TRX 111, 121; 210A, 210B, 210C.

According to some aspects, the at least one TRX 111, 121; 210A, 210B, 210C comprises a point to point microwave radio link transceiver.

According to some aspects, the processing unit 220, 420 arranged to determine an onset of accumulated precipitation on the antenna radome of the at least one TRX 210A, 210B, 210C is comprised in a central processing node 410.

According to some aspects, the adaptive antenna radome system comprises one TRX 111 only, wherein the processing unit 150' that is arranged to determine an onset of accumulated precipitation on the antenna radome of said TRX 111 is comprised in said TRX 111.

According to some aspects, the processing unit 150, 220, 420 is arranged to determine the onset of accumulated precipitation on the antenna radome of the at least one TRX 111, 121; 210A, 210B, 210C based on the link data using a machine learning algorithm.

According to some aspects, the processing unit 220, 420 is arranged to determine the onset of accumulated precipitation on the antenna radome of the at least one TRX 210A, 210B, 210C based on the link data using a classification device 225.

Generally, the present disclosure also relates to a processing unit 150, 220, 420 arranged to determine an onset of accumulated precipitation on an antenna radome of at least one TRX 111, 121; 210A, 210B, 210C and to activate the corresponding antenna radome heating device 140, 141 by a control signal R1, R2, RN in response to determining the onset of accumulated precipitation.

According to some aspects, the processing unit 150, 220, 420 is arranged to obtain link data X1, X2, XN from the at least one TRX 111, 121; 210A, 210B, 210C, wherein the link data X1, X2, XN comprises received signal power data associated with an operation of the at least one TRX 111, 121, 210A, 210B, 210C, where the processing unit 150, 220, 420 further is arranged to determine the onset of accumulated precipitation on the antenna radome of the at least one TRX 111, 121; 210A, 210B, 210C based on the link data X1, X2, XN.

According to some aspects, the processing unit 150, 220, 420 is arranged to monitor a precipitation level in a geographical region in which the at least one TRX 111, 121; 210A, 210B, 210C is deployed by comparing the received signal power data with a respective reference signal power level of the at least one TRX 111, 121; 210A, 210B, 210C, and to determine the onset of accumulated precipitation on the antenna radome of the at least one TRX 111, 121; 210A, 210B, 210C based on the precipitation level.

According to some aspects, the link data X1, X2, XN further comprises any of; an adaptive filter state, a mean-squared error (MSE) value associated with data detection, and a power difference determined before and after channel filter, associated with the at least one TRX 111, 121; 210A, 210B, 210C.

According to some aspects, the processing unit 150, 220, 420 is arranged to obtain weather data 230 associated with a geographical region in which at least one TRX 111, 121; 210A, 210B, 210C is deployed, wherein the processing unit 150, 220, 420 is arranged to determine the onset of accumulated precipitation on the antenna radome of at least one TRX 111, 121; 210A, 210B, 210C based on the weather data 230.

According to some aspects, the weather data 230 comprises a current temperature value indicating an ambient temperature in a vicinity of at least one TRX 111, 121; 210A, 210B, 210C.

According to some aspects, the weather data 230 comprises weather prediction information indicating a future weather condition in a geographical vicinity of at least one TRX 111, 121; 210A, 210B, 210C.

According to some aspects, the processing unit 220, 420 arranged to determine an onset of accumulated precipitation on the antenna radome of at least one TRX 210A, 210B, 210C is comprised in a central processing node 410.

According to some aspects, the processing unit 150, 220, 420 is arranged to determine the onset of accumulated precipitation on the antenna radome of at least one TRX 111, 121; 210A, 210B, 210C based on the link data using a machine learning algorithm.

According to some aspects, the processing unit 220, 420 is arranged to determine the onset of accumulated precipitation on the antenna radome of at least one TRX 210A, 210B, 210C based on the link data using a classification device 225.

Generally, the present disclosure also relates to methods as described above.

Generally, the present disclosure also relates to a computer program product 700 comprising a computer program 710 according to the methods described above, and a computer readable storage medium 720 on which the computer program is stored.

Generally, the present disclosure also relates to a point to point radio link 100 comprising an adaptive antenna radome heating system 200, 300, 400 according to the above.

The invention claimed is:

1. A processing unit, comprising:
   processing circuitry;
   memory containing instructions executable by the processing circuitry whereby the processing unit is configured to:
   predict, based on a machine learning classification, an onset of accumulated precipitation on an antenna radome of at least one point to point radio link transceiver (TRX); and
   activate a corresponding antenna radome heating device by a control signal in response to predicting the onset of the accumulated precipitation before accumulation of the precipitation at the at least one point to point radio link TRX.

2. The processing unit of claim 1, wherein the instructions are such that the processing unit is configured to:
   obtain link data from the at least one TRX, wherein the link data comprises received signal power data associated with an operation of the at least one TRX; and
   predict the onset of the accumulated precipitation on the antenna radome of the at least one TRX based on the link data.

3. The processing unit of claim 2, wherein the instructions are such that the processing unit is configured to:
   monitor a precipitation level in a geographical region in which the at least one TRX is deployed by comparing the received signal power data with a respective reference signal power level of the at least one TRX; and
   predict the onset of the accumulated precipitation on the antenna radome of the at least one TRX based on the precipitation level.

4. The processing unit of claim 2, wherein the link data further comprises
a mean-squared error (MSE) value associated with data detection associated with the at least one TRX.

5. The processing unit of claim 2, wherein the instructions are such that the processing unit is configured to predict the onset of accumulated precipitation on the antenna radome of the at least one TRX based on the link data as input to a machine learning algorithm.

6. The processing unit of claim 2, wherein the instructions are such that the processing unit is configured to predict the onset of accumulated precipitation on the antenna radome of the at least one TRX based on the link data as input to the classification device.

7. The processing unit of claim 1, wherein the instructions are such that the processing unit is configured to:
obtain weather data associated with a geographical region in which the at least one TRX is deployed; and
predict the onset of the accumulated precipitation on the antenna radome of the at least one TRX based on the weather data.

8. The processing unit of claim 7, wherein the weather data comprises a current temperature value indicating an ambient temperature in a vicinity of the at least one TRX.

9. The processing unit of claim 7, wherein the weather data comprises weather prediction information indicating a future weather condition in a geographical vicinity of the at least one TRX.

10. The processing unit of claim 1, wherein the processing unit is comprised in a central processing node.

11. An adaptive antenna radome heating system for a point to point radio link, the adaptive antenna radome heating system comprising:
at least one point to point radio link transceiver (TRX), each of the at least one TRX comprising an antenna radome and having an antenna radome heating device configured to be activated by a control signal; and
a processing unit comprising processing circuitry and configured to:
predict, based on a machine learning classification, an onset of accumulated precipitation on the antenna radome of the at least one point to point radio link TRX; and
activate a corresponding antenna radome heating device by the control signal in response to predicting the onset of the accumulated precipitation before accumulation of the precipitation at the at least one point to point radio link TRX.

12. The adaptive antenna radome heating system of claim 11, wherein the at least one TRX comprises a point to point microwave radio link transceiver.

13. The adaptive antenna radome heating system of claim 11:
wherein the adaptive antenna radome heating system comprises one TRX only; and
wherein the processing unit is comprised in the one TRX.

14. A method for controlling adaptive antenna radome heating in one or more point to point radio links, the method comprising:
predicting, based on a machine learning classification, an onset of accumulated precipitation on the antenna radome of at least one point to point radio link transceiver (TRX); and
activating a corresponding antenna radome heating device by a control signal in response to predicting the onset of the accumulated precipitation before accumulation of the precipitation at the at least one point to point radio link TRX.

15. The method of claim 14, wherein the method comprises:
obtaining link data from the at least one TRX, wherein the link data comprises received signal power data associated with an operation of the at least one TRX; and
predicting the onset of accumulated precipitation on the antenna radome of the at least one TRX based on the link data.

16. The method of claim 15, wherein the method comprises:
monitoring a precipitation level in a geographical region in which the at least one TRX is deployed by comparing the received signal power data with a respective reference signal power level of the at least one TRX; and
predicting the onset of the accumulated precipitation on the antenna radome of the at least one TRX based on the precipitation level.

17. The method claim 14, wherein the method comprises:
obtaining weather data associated with a geographical region in which the at least one TRX is deployed; and
predicting the onset of the accumulated precipitation on the antenna radome of the at least one TRX based on the weather data.

18. The method of claim 17, wherein the weather data comprises:
a current temperature value indicating an ambient temperature in a vicinity of the at least one TRX; and/or
weather prediction information indicating a future weather condition in a geographical vicinity of the at least one TRX.

19. The method of claim 14, wherein the predicting an onset of the accumulated precipitation on the antenna radome comprises predicting the onset of the accumulated precipitation on the antenna radome of the at least one TRX based on the link data as input to a machine learning algorithm.

20. A non-transitory computer readable recording medium storing a computer program product for controlling an adaptive antenna radome heating system for a point to point radio link, the computer program product comprising program instructions which, when run on processing circuitry of the network entity, causes the adaptive antenna radome heating system to:
predict, based on a machine learning classification, an onset of accumulated precipitation on an antenna radome of at least one point to point radio link transceiver (TRX); and
activate a corresponding antenna radome heating device by a control signal in response to predicting the onset of the accumulated precipitation before accumulation of the precipitation at the at least one point to point radio link TRX.

* * * * *